United States Patent [19]
McGee et al.

[11] Patent Number: 5,567,773
[45] Date of Patent: Oct. 22, 1996

[54] COLD SEALABLE COHESIVE POLYMERS

[75] Inventors: Dennis E. McGee, Penfield; Robert E. Touhsaent, Fairport, both of N.Y.

[73] Assignee: Mobil Oil Corporation, Fairfax, Va.

[21] Appl. No.: 416,252

[22] Filed: Apr. 4, 1995

[51] Int. Cl.$^6$ .................................................. C08L 33/02
[52] U.S. Cl. .................... 525/221; 525/222; 525/228; 428/515; 428/516; 428/520
[58] Field of Search .................... 525/221, 222, 525/228; 428/515, 516, 520

[56] References Cited

U.S. PATENT DOCUMENTS

| | | | |
|---|---|---|---|
| Re. 24,906 | 12/1960 | Ulrich | 206/59 |
| 2,790,735 | 4/1957 | McLaughlin et al. | 117/155 |
| 2,795,564 | 6/1957 | Conn et al. | 260/29.6 |
| 3,309,330 | 3/1967 | Settlage | 260/29.6 |
| 3,365,410 | 1/1968 | Wesslau et al. | 260/29.6 |
| 3,396,153 | 8/1968 | Vitalis et al. | 260/80.7 |
| 3,696,082 | 10/1972 | Smith | 260/80.8 |
| 3,822,175 | 7/1974 | Yuan | 161/93 |
| 4,000,359 | 12/1976 | Watts et al. | 526/328 |
| 4,058,645 | 11/1977 | Steiner | 428/518 |
| 4,058,649 | 11/1977 | Steiner | 428/518 |
| 4,081,418 | 3/1978 | Barua et al. | 260/29.6 |
| 4,185,050 | 1/1980 | Lazear et al. | 525/221 |
| 4,403,464 | 9/1983 | Duncan | 53/452 |
| 4,456,741 | 6/1984 | Ames | 526/264 |
| 4,500,683 | 2/1985 | Hori et al. | 524/533 |
| 4,629,657 | 12/1986 | Gulatti et al. | 428/461 |
| 4,749,616 | 6/1988 | Liu et al. | 428/331 |
| 4,898,787 | 2/1990 | Min et al. | 428/480 |
| 5,070,164 | 12/1991 | Min et al. | 526/286 |
| 5,145,929 | 9/1992 | Ou-Yang | 526/338 |

FOREIGN PATENT DOCUMENTS

| | | |
|---|---|---|
| 146604 | 2/1981 | Germany . |
| 4341815.5 | 12/1993 | Germany . |
| 1003318 | 9/1965 | United Kingdom . |

*Primary Examiner*—Vasu S. Jagannathan
*Attorney, Agent, or Firm*—Ronald A. Bleeker; Dennis P. Santini; Jessica M. Sinnott

[57] ABSTRACT

An adhesive coating which is pressure sealable to itself and non-blocking to a dissimilar coating is described. The coating comprises a blend of (a) a soft polymer having a measured glass transition temperature below room temperature; and (b) a hard polymer having a measured glass transition temperature which is above the measured glass transition temperature of the soft polymer (a). The soft polymer and the hard polymer are combined in a low blocking, pressure sealable coating formable proportion. A method of making the adhesive coating comprising the step of blending the soft polymer and the hard polymer and coated substrates formed from the adhesive coating are also described.

37 Claims, No Drawings

COLD SEALABLE COHESIVE POLYMERS

FIELD OF THE INVENTION

This invention relates to cold sealable cohesive polymers; more particularly, this invention relates to an improved process for making cold sealable cohesive polymers. This invention is also related to products made by the improved process.

BACKGROUND OF THE INVENTION

Plastic packaging structures, such as plastic films, can be provided with adhesive coatings to enable an effective seal to be obtained. These adhesive coatings may be heat sealable at elevated temperatures; or they may be cold sealable at lower temperatures, typically from 0° to 40° C. In packaging heat sensitive materials, especially foodstuffs (such as candy, chocolates and ice cream) the use of heated elements must be avoided to prevent spoiling the packaged product.

Previous commercial cold sealable, pressure-sensitive coatings while not requiring the use of heated elements in the sealing process have high surface tack and a tendency to block.

SUMMARY OF THE INVENTION

This invention provides a cold sealable, pressure-sensitive cohesive coating which is cohesive only when placed under pressure in contact with similarly coated surfaces and has low surface tack to, and does not block with, dissimilar surfaces or coatings. The coatings have good wetting ability, good coating uniformity and good seal strength on diverse substrates, including plastic film and paper; they are sealable at as low as possible a temperature to facilitate increased machine times and speeds. Finally, the coatings are free from objectionable odor; so they are usable with foodstuffs; and have excellent optical properties, such as gloss.

The invention is specifically directed to an adhesive coating which is pressure sealable to itself and non-blocking to a dissimilar coating comprising a blend of (a) a soft polymer having a measured glass transition temperature below room temperature; and (b) a hard polymer having a measured glass transition temperature which is higher than the measured glass transition temperature of the soft polymer (a) in a low blocking, pressure sealable coating formable proportion.

The invention is also directed to a process for making an adhesive coating which is pressure sealable to itself and non-blocking to a dissimilar coating and an adhesive coating product made by this process.

Still further, the invention is directed to a substrate coated with the adhesive coating.

DETAILED DESCRIPTION OF THE INVENTION

The adhesive coating of this invention, which is pressure sealable to itself and non-blocking to a dissimilar coating comprises, (a) a soft polymer having a measured glass transition temperature ($T_g$) below room temperature; and (b) a hard polymer having a measured glass transition temperature which is higher than the measured glass transition temperature of soft polymer.

The (a) Soft Polymer

The (a) soft polymer is prepared by polymerizing (i) at least one monomer which comprises a nitrile having ethylenic unsaturation conjugated with the nitrile group with at least one of the following (ii) at least one copolymerizable soft monomer; and (iii) at least one copolymerizable functional monomer in soft polymer formable proportions.

Where monomer (i) solely comprises a nitrile it is employed in an amount ranging from about 5 to about 20% by weight, more specifically from about 9 to about 14% by weight, based on 100 wt. % of the soft polymer mixture (a).

Monomer (i) can further comprise at least one monomer comprising an alkyl methacrylate having from 1 to 12 carbon atoms in the alkyl group or a vinyl aromatic. Where monomer (i) includes an alkyl methacrylate or a vinyl aromatic, it is employed in an amount sufficient to achieve the desired measured glass transition temperature of the soft polymer.

The (i) alkyl methacrylates contemplated are selected from the group consisting of methyl methacrylate, ethyl methacrylate, propyl methacrylate, isopropyl methacrylate, n-butyl methacrylate, iso-butyl methacrylate, t-butyl methacrylate, n-pentyl methacrylate, isopentyl methacrylate, hexyl methacrylate, n-octyl methacrylate, 2-ethylhexyl methacrylate, decyl methacrylate and dodecyl methacrylate.

The vinyl aromatics contemplated include styrene, an α-alkyl styrene or vinyltoluene.

Monomer (ii) comprises at least one copolymerizable soft monomer comprising an alkyl acrylate having from 1 to 12 carbon atoms in the alkyl group; 1,3-butadiene; or a vinyl or vinylidene ester, preferably methyl acrylate, ethyl acrylate, propyl acrylate, isopropyl acrylate, butyl acrylate, isobutyl acrylate, t-butyl acrylate, n-pentyl acrylate, isopentyl acrylate, hexyl acrylate, n-octyl acrylate, iso-octyl acrylate, 2-ethylhexyl acrylate, decyl acrylate, 1,3-butadiene, vinyl acetate or vinylidene chloride, especially methyl acrylate or ethyl acrylate.

Monomer (ii) is suitably employed in an amount from about 80 to about 95 wt. % by weight, specifically, from about 85 to about 90 wt. % by weight, based on 100 wt. % of the soft polymer mixture.

Monomer (iii) suitably comprises at least one copolymerizable functional monomer comprising an ethylenically unsaturated compound containing a carboxylic or a sulphonic acid group, desirably an alpha-, beta-ethylenically unsaturated carboxylic acid, preferably acrylic acid, methacrylic acid, itaconic acid, crotonic acid, malic acid; or sulfoethyl methacrylate, especially acrylic acid or methacrylic acid.

Monomer (iii) is employed in an amount ranging from about 0.1 to about 10 wt. %, specifically about 0.5 to about 5 wt. % by weight based on 100 wt. % of the soft polymer mixture.

The measured $T_g$ of the soft polymer (a) is below room temperature. Room temperature is defined as about 20° C. to about 25° C. Typically, the measured $T_g$ of the soft polymer ranges from about −25° C. up to about 15° C., specifically about −15° C. to about 5° C. The method for measuring $T_g$ is well known and can be determined following the equation set forth in U.S. Pat. No. 4,898,787.

The weight average molecular weight of the soft polymer (a) is less than about 150,000 daltons.

The (b) Hard Polymer

In one aspect of the invention, the (b) hard polymer is prepared by polymerizing (i) at least one monomer which comprises an alkyl methacrylate having from 1 to 12 carbon atoms in the alkyl group, a vinyl aromatic or a nitrile having ethylenic unsaturation conjugated with the nitrile group; (ii) at least one copolymerizable soft monomer; and (iii) at least one copolymerizable functional monomer in hard monomer formable proportions.

In a more specific aspect of the invention, monomer (i) comprises at least one monomer selected from the group consisting of acrylonitrile or methacrylonitrile, methyl methacrylate, ethyl methacrylate, propyl methacrylate, iso-propyl methacrylate, n-butyl methacrylate, iso-butyl methacrylate, t-butyl methacrylate, n-pentyl methacrylate, iso-pentyl methacrylate, hexyl methacrylate, n-octyl methacrylate, 2-ethylhexyl methacrylate, decyl methacrylate, dodecyl methacrylate; styrene, an alkyl styrene or vinyltoluene.

Monomer (i) is employed in an amount ranging from about 15 wt. % to about 60 wt. %, more specifically from about 20 wt. % to about 40 wt. %, based on 100 wt. % of the hard polymer mixture (b).

The monomers (ii) and (iii) are as described above.

Monomer (ii) is employed in an amount ranging from about 40 wt. % to about 85 wt. %, more specifically from about 60 wt. % to about 80 wt. %, based on 100 wt. % of the hard polymer mixture (b).

Monomer (iii) is employed in an amount ranging from about 1 wt. % to about 10 wt. %, more specifically from about 4 wt. % to about 8 wt. %, based on 100 wt. % of the hard polymer mixture (b).

The monomers (i); (ii) and (iii) are combined to achieve a hard polymer having a measured $T_g$ which is higher than the measured $T_g$ of soft polymer (a). Typically, the $T_g$ is at least about room temperature but it can be slightly lower than room temperature. In general, the measured $T_g$ ranges from about 15° C. to about 60° C., specifically about 20 to about 40° C. In any event, the measured $T_g$ of the hard polymer is higher than the measured $T_g$ of the soft polymer with which it is combined.

In another aspect of the invention the hard polymer (b) is selected from the group consisting of all-acrylic based polymers; urethanes; ionomers, such as MICHEMPRIME 4983, an ethylene acrylic acid copolymer; and polyester-based polymers such as Eastman 31125 (available from Eastman).

Polymerization Process

The polymers (a) and (b) can be prepared by emulsion polymerization in which the mixture of monomers are emulsified in aqueous medium.

The process for preparing the polymer comprises mixing the monomers in relative proportions to produce the desired $T_g$ and polymerizing the monomers under emulsion polymerization conditions. The emulsion polymerization process is conducted in known apparatus; for example in a stirred reactor with heating and cooling. The polymerization may be effected in the presence of water, an emulsifying agent and a catalyst with may be a free radical catalyst or a redox system.

The procedure for charging the reactor may comprise forming a solution of all the monomers; the water; the emulsifier; and the catalyst. As an alternative, a portion of the catalyst may initially be charged and the remainder added, slowly, during the polymerization. It is also possible, initially, to charge a portion of the water and of the emulsifier and to prepare, from the remainder of the water and emulsifier, a preemulsion containing the monomers which is added slowly at the polymerization temperature, the catalyst again being initially charged separately or a portion thereof being added separately. It is also possible to add the monomer mixture in the form of a preemulsion and in a second stage to add the monomer mixture in bulk, i.e. without water and emulsifier, and to add the catalyst separately but in parallel therewith. Initially, charge the solution of water and emulsifier and slowly add the monomer mixture and, separately therefrom but in parallel therewith, the catalyst in water, at the polymerization temperature. Subsequently, after renewed addition of emulsifier, in the second polymerization stage the remainder of the monomer mixture is metered into the reactor. The remainder of the catalyst which is not charged initially, can also be added completely after the addition of the monomers. However, this subsequent metered addition of catalyst is less advantageous.

The final polymer can be in the form of a latex emulsion. Alternatively a solution polymer can be formed in which at least a portion of the polymer is in a solution phase with 0 to about 99% of the polymer being in the dispersed phase, more specifically 0 to about 60% of the polymer being in the dispersed phase. Typically, the solution polymer is formed by adding a sufficient amount of base to the emulsion to dissolve the polymer. In one embodiment of the invention, the soft polymer (a) is a latex emulsion and the hard polymer (b) is a solution polymer in which at least a portion of the polymer is in the solution phase.

A core/shell polymer can be formed by performing a first polymerization with the soft polymer (a) following by addition of the hard polymer (b) which forms a core/shell polymer. This technique is known in the art and is described in U.S. Pat. No. 3,309,330. A core/shell polymer, in which the core is comprised of the monomers of polymer (a) and the shell is comprised of the monomers of polymer (b), could be processed in a two-step polymerization. The ratio of the core-to-shell would be the same as the blend ratio of polymers (a) and (b) which is specified herein.

Typical catalysts for the polymerization include hydrogen peroxide, benzoyl peroxide, inorganic persulfates such as ammonium or potassium persulfate; inorganic perphosphates such as ammonium or potassium perphosphate; organic peresters such as perisopivalates. Redox systems require combination of such oxidants with a water soluble reductant; for example sulfur compounds such as alkali metal bisulfites, thiosulfates or hydrosulfites; ascorbic acid; triethylamine; hydrazine; hydroxylamine; glycolic acid or tartaric acid. Generally, the total amount of catalyst employed may be from 0.1% by weight to 2% by weight based on the total weight of the monomer.

The emulsion polymerization may typically be carried out in the presence of one or more anionic, nonionic or cationic emulsifiers; for example, alkyl carboxylic acid salts, phosphoric acid salts, alkyl sulfate salts, alkyl sulfonate salts, alkyl aryl ether alcohols and alkyl aryl polyether sulfate salts. More particularly, examples of anionic emulsifiers include alkali metal or ammonium salts of sulfuric acid monoesters of alkylphenols or of alcohols; sulfuric acid monoesters of ethoxylated alkylphenols or ethoxylated alcohols; or phosphoric esters of alkoxylated alkylphenols. Examples of emulsifiers utilized include alkali metal salts of sulfuric acid monoesters of nonylphenol reacted with 23 mol of ethylene oxide per mole, alkyl- or arylsulfonate, sodium lauryl sulfate, sodium lauryl ethoxylate sulfate and the alkali metal salt of diesters of sulfosuccinic acid with alcohols having 6 to 20 carbon atoms. The nonionic emulsifiers which are preferably used are ethers of nonylphenols reacted with 5 to 23 mol of ethylene oxide. It is preferred to use a sodium dodecyl benzene sulfonate. A suitable surfactant/ emulsifier of that type is Maranil A75 sold by Henkel. This emulsifier can be used in the paste or the powder form. Since the paste form dissolves easily, it may be easier to use. Generally, the total amount of emulsifier employed may be from 0.01 to 2.0 percent by weight based on the total amount of water.

The polymerization may be conducted in a redox system or in a higher temperature thermal process using a persulfate-type initiator or an azobisisobutryonitrile initiator.

In general the polymerization may be carried out at a temperature from about 40° C. to about 100° C., specifically from about 70° C. to about 90° C. at a pressure ranging from about 101 kPa to about 308 kPa (0 to 30 psig). A thermal polymerization may be carried out at the higher range of these temperatures, typically at above about 70° C. The reaction may be conducted in glassware with a reflux condenser. This stage is usually carried out in the presence of an inert gas such as nitrogen. The polymerization is generally carried out for a time ranging from about 1 to about 8 hours, specifically from about 3 to about 4 hours. After completion of the polymerization reaction, the pH of the polymer can be adjusted up to 10, more specifically, from about 6 to about 10.

In a two-stage polymerization contemplated, in a first stage from about 5 to about 70% by weight of a monomer mixture is polymerized followed by a second stage in which the remaining 30 to 95% by weight of the monomer mixture is polymerized in the presence of the polymer obtained in the first stage. This procedure is further described in U.S. Pat. No. 4,898,787 which is incorporated herein by reference for the description of the two stage emulsion polymerization process.

The resulting copolymers of this invention are at least partially neutralized by the addition of base. The bases employed are ammonia and/or amines, advantageously in the form of an aqueous solution of the neutralizing agent. Ammonia is particularly preferred.

Examples of suitable chain transfer agents that may be employed in the polymerization include mercaptans; polyhalogen compounds; and branched aromatic hydrocarbons such as isooctylthioglycolate, thioglycerol, dodecylmercaptan or trimethylbenzene. Usual amounts are from about 0.1 to about 5% by weight based on the total weight of monomers in the mixture and the chain transfer agent is preferably employed at all stages of the polymerization. When isooctylthioglycolate is employed, the concentration can range from about 0.25 to about 3 parts per hundred, based on 100 parts of the polymer.

In one aspect of the invention, the balance between the seal temperature and the seal strength is impacted by the molecular weight of the soft polymer (a). In general, a molecular weight that is less than 150,000 is preferred. The higher molecular weight can improve blocking properties. In order to achieve high molecular weights, the amount of the chain transfer agent can be limited to less than about 2% by weight based on the total weight of monomers in the mixture, specifically the amount of the chain transfer agent can range from about 0.5% to about 1.5% by weight based on the total weight of monomers in the mixture. The molecular weight of the hard polymer (b) is not critical.

Coating Formulation

After making the soft polymer (a) and the hard polymer (b), they are combined in a low blocking, pressure sealable coating formable proportion. Specifically, the relative proportion of the soft polymer (a) to hard polymer (b) is about 20 parts hard polymer to about 60 parts hard polymer, specifically about 35 parts hard polymer to about 45 parts hard polymer, based upon 100 parts soft polymer. The polymers can be combined by any method known in the art. Typically they are thoroughly blended. If necessary, conventional additives for the production of the sealing coating are added either to the (a) soft polymer and/or the (b) hard polymer separately or to the final polymer mixture. Additives contemplated include, for example, particulates such as talc or amorphous silica and/or cross-linking agents such as zinc oxide or melamine formaldehyde.

A minor amount of a surfactant, such as "Tergitol" can be used as a dispersant for the silica particles. The surfactant can be used in an amount ranging from about 0.1 parts per hundred to about 5 parts per hundred, based on 100 parts of the total particulates.

The coating of this invention, typically includes conventional coating additives such as antiblocking additives; hydrophobicizing agents; slip additives; and antifoaming additives, stabilizers, dying adjuvants, pigments, corn starch, silica, talc, other compounding aids to control surface tack and other properties. Thickeners or bodying agents may be added to the polymers to control the viscosity of the polymer and achieve proper flow properties for the particular application desired.

The machine properties of the pressure sealable coated surface can be improved by the addition of solid finely divided, water insoluble inorganic materials, for example, micron-sized silica, such as SYLOID 63 FP sold by W. R. Grace. The amount of finely divided silica can range from about 0.5 to about 10 wt. % based on the total weight of the polymer, specifically about 2.5 to about 5.5 wt. %, based on the total weight of the polymer.

Suitable antiblocking additives which may be added to the non-sealable surface are finely dispersed minerals and finely divided waxes and wax-like materials which melt at temperatures above the maximum temperatures occurring during storage of sealable structures comprising them and which are not soluble in the copolymer of the invention at these temperatures. Examples of natural waxes are paraffin wax, microcrystalline wax, beeswax, carnauba wax, Japan wax, and montan wax; examples of synthetic waxes are hydrogenated castor oil, chlorinated hydrocarbon waxes and long-chain fatty acid amides. The above-mentioned waxes also lead to an improvement in the cold-slip properties of the coated plastic films which should be understood as the ability of the film to slip over surfaces at room temperature.

A cross-linking agent may also be employed to increase the seal strength of the pressure sealable coating and to minimize transfer of the coating to the outside of the structure upon prolonged storage of a roll of the coated film. A suitable cross-linking agent is, typically, a melamine crosslinking agent such as the materials available commercially from the Cytec: CYMEL 373, a polymeric partially methylated melamine formaldehyde resin having a degree of polymerization of 2.3; or CYMEL 385, a polymeric partially methylated melamine formaldehyde resin having a degree of polymerization of 2.1.

Coated Substrate

After drying, the resulting polymeric formulation adheres to corona or flame treated packaging film substrates or substrates coated with a primer. In many cases, the adhesion is unchanged after 3 days at 85° F, 80% relative humidity. Once solidified by drying, the coated surface does not strongly adhere to non-treated, uncoated film surfaces or to surfaces coated with dissimilar coatings such as untreated polypropylene, acrylic-based surface coating, polymers containing waxes and/or fatty amides or derivatives of dimethyl siloxane. Moreover, the coating exhibits a low coefficient of friction to metal machine parts.

This invention further provides a cold sealable composition comprising a polymer as herein defined.

The coating of this invention may, in one embodiment of the invention, be produced in the absence of any material or process step not specifically described herein.

The present invention also provides a sealable structure comprising a substrate coated on a surface thereof with such a cold sealable composition; and a sealed such structure containing perishable goods.

Before applying a cold sealable composition of the invention to a substrate, such as a plastic film, to form a sealable structure of the invention, the surface of the film is generally pretreated in order to ensure that the coating adheres firmly to the substrate. This treatment is carried out in accordance with known procedures; for example, by chlorinating the plastic film substrate; by oxidizing it with agents such a chromic acid or hot air; by steam treatment; by corona discharge; or flame treatment. The pretreatment used is preferably flame treatment or high-voltage corona discharge.

After being pretreated, the surface of the substrate is generally precoated with a primer that helps to anchor the topcoat in order to ensure the adhesion of the coating to the substrate film. Appropriate precoating agents or primers, are known from the literature and include, for example, alkyl titanates; epoxy-type primers; melamine-formaldehyde and polyethyleneimines. The latter are particularly suitable for precoating plastic films as in polystyrene latex which contains at least one epoxy functionality. In this context, the polyethyleneiminies can be applied to the optionally pretreated plastic films either from organic or from aqueous solutions. In this case the concentration of the polyethyleneimine in the aqueous or organic solution may be, for example, about 0.5% by weight. Suitable polyethyleneimine primers are described in DE-A-24 40 112 and U.S. Pat. No. 3,753,769.

The uncoated plastic films generally have a thickness of from about 0.015 to about 0.060 mm. The aqueous sealing coating is applied to the film in a conventional manner, for example, by gravure application, roller application, dipping or spraying with aid of the intaglio or flexographic printing process or the reverse-roll application process. The excess aqueous solution can be removed by squeeze rollers or draw-off blades. The sealing coatings should conventionally be applied in a quantity such that, during drying, a smooth, uniformly distributed layer having a weight of from about 0.5 to about 5 g/m$^2$ is laid down. Specifically, about 0.6 to about 1.6 g/m$^2$ is laid down.

The coating formed by the sealing coating on the plastic film is subsequently dried with hot air, radiated heat or by any other conventional means. It is not necessary to apply the release coating layer which is necessary when using cold sealing-coatings.

The pressure sealable coating of this invention is usually the inside coating of the substrate while another coating formulation, such as "Standard Acrylic" is the outside coating. The outside coating can have a wax content of about 2 to about 20 parts per hundred, specifically about 10 to about 12 parts per hundred, based upon 100 parts of the acrylic.

The low adhesion to commercial acrylic-based coatings having an approximate measured $T_g$ ranging from about 40 to about 70° C., and other dissimilar surfaces and coatings of the cold sealable composition of this invention is an important feature of the invention. These coatings impart combined properties of machinability and printabilty to untreated and release-treated polypropylene which is important because the untreated and release-treated polypropylene, while being machinable, is not printable.

The polymeric portion of the acrylic based coatings to which the coating composition of the invention will not block, or will not pose significant blocking problems, should contain at least 80 wt. % acrylic, preferably greater than 90 wt. % acrylic. Small amounts of other materials such as polyacrylonitrile and ethylene acrylic acid can also be present in the acrylic-based polymer, typically, less than 10 wt. %. The acrylic-based coating can be formulated with particles such as polyethylene, silicon and silicone, silica, talc or other particulates ranging in size from about 0.5 to about 4.0 microns.

The coating of this invention presents a smooth, non-tacky surface which will not block to acrylic-based surface coatings under normal operating conditions. However, if similarly coated surfaces are placed in contact with each other, under pressure, and at an elevated temperature up to about 66° C., at room temperature or even at below room temperature, for example 16° C. then the similarly coated surfaces become cohesive forming a strong bond between each other. With certain polymers, the bond created may even be stronger than the film itself.

The heat required to make a seal can be affected by the thickness of the composition on the substrate if the film is not sealable at ambient temperatures. Thicker substrates can require higher temperatures for pressure sealability. The sealability can also be affected by the thickness of the coating on the film. Higher coating weights tend to improve sealability. The sealing temperature required to form a seal using the coating of this invention is low enough for the film to be considered a cold sealable coating.

Although the coating will form a seal at ambient temperatures (about 20° C. to about 25° C.), and even lower than ambient temperatures, some packagers may use heat up to about 70° C. if the packaged product is not heat sensitive and where hermetic seals are desirable. The coating compositions of this invention can be used in such heat sealing operations.

Sealing will occur with the application of pressure. During the application of pressure, the sealing coating surfaces are placed in contact in a manner which mats them together. At ambient temperatures, the pressures applied are generally from about 20 to about 100 psig (about 239 to about 791 kPa), more specifically from about 40 to about 80 psig (about 377 to about 653 kPa). Sealing times of from a few 1,000ths of a second to upto a few 10ths of a second are generally adequate.

The cold sealable compositions of the present invention are very useful for imparting high cold seal bond strength to packaging film substrates. Substrates which are particularly contemplated for use with these cold sealable compositions to provide sealable structures include olefin polymers, such as polyethylene, cast or oriented polypropylene, coextruded films, nylon, white opaque film, cellophane, paper, polyesters, high density polyethylene and linear low density polyethylene.

A uniform coating of the present invention can be applied which eliminates the need for the expensive extra step of pattern application which is required for coatings which are tacky at room temperature and more prone to blocking, such as the commercially available pressure sealable coatings.

EXAMPLE 1

This example relates to the preparation of a soft polymer latex which contained a ratio of 88/11/1 ethyl acrylate/acrylonitrile/acrylic acid.

454 parts demineralized water and 0.22 parts Maranil A-75 (an emulsifier manufactured by Henkel) were weighed into a reactor. This charge was heated to 80° C. A mixture of 38.2 parts acrylonitrile, 3.47 parts acrylic acid, 305 parts ethyl acrylate and 4.34 parts isooctylthioglycolate and 2.0 parts demineralized water were weighed into a monomer tank and premixed. A solution of 0.35 parts ammonium bicarbonate and 0.52 parts ammonium persulfate in 86.1 parts demineralized water along with 0.56 parts Maranil A-75 were premixed in a peroxide tank. In a stainless steal or plastic container 0.52 parts ammonium peroxydisulfate and 4.68 parts demineralized water were premixed and added to the reactor after five minutes. The contents of the monomer tank were added to the reactor within 2.5 hours at 80° C. at a constant rate. The contents of the peroxide tank were added within 2.75 hours at a constant rate to the reactor. The monomer addition was started 15 minutes before the addition of the peroxide mixture. After adding all the peroxide mixture, the batch was held for 30 minutes at 80° C. A premixed solution of 13.54 parts ammonia (25% strength) and 87 parts demineralized water was added to the monomers over a period of about 15 minutes at 70°–80° C. The batch was polymerized over a period of about one hour at 80° C., then cooled to about 50° C. The contents of the reactor were filtered and determined to have a solids content of about 35%, pH of about 9.5, particle size of about 150 nm, surface tension of about 39 dynes/cm and viscosity of less than 50 cP (0.05 Pa s).

EXAMPLE 2

This example relates to the preparation of a hard polymer semi-solution which contains a ratio of 72.5/22.5/5.0 of ethyl acrylate/acrylonitrile/acrylic acid.

257 parts of demineralized water and 0.12 parts of Maranil A-75 were added to a reactor. The charge was heated to 80° C. with slow agitation. In a separate tank, 44.7 parts acrylonitrile, 9.94 parts acrylic acid, 144 parts ethyl acrylate and 2.48 parts isooctylthioglycolate were mixed. Into a peroxide tank was added 0.30 parts ammonium persulfate, 0.32 parts Maranil A-75 and 80.8 parts demineralized water and premixed. In a stainless steel or plastic container 0.3 parts ammonium peroxydisulfate and 3.49 parts demineralized water were premixed and held for 5 minutes. The contents of the monomer tank were added to the reactor within 2.5 hours at 80° C. at a constant rate. The contents of the peroxide tank were added within 2.75 hours at a constant rate to the reactor. The monomer addition was started 15 minutes before the addition of the peroxide mixture. 38 parts demineralized water was added to the reactor and the batch was held at 80° C. for 30 minutes. Then, 330 parts demineralized water were added and thereafter a premixed solution of 16.1 parts ammonia and 67.7 parts demineralized water were added within about 15 minutes at about 70°–80° C. The batch was held for one hour at about 80° C., with agitation, and then cooled to 50° C. The polymer was filtered and determined to have a solids content of about 19% and a pH of about 9.5.

EXAMPLE 3

This example relates to the preparation of an aqueous pressure sealable coating.

The soft polymer of example 1 and the hard polymer of example 2 were combined in a ratio of 71.4 parts soft polymer to 28.6 parts hard polymer at room temperature. To the mixture was added, with stirring 3.5 parts SYLOID 63 FP (which had been previously dispersed in a Waring blender with 17.6 parts water and 0.18 parts TERGITOL 15-S-9 sold by Union Carbide), 1 part CYMEL-385 (a crosslinking agent) to form a pressure sealable coating.

EXAMPLE 4

This example relates to the preparation of a film coated with the pressure sealable coating.

A 33 micron white opaque polyolefin film was primed with polyethyleneimine. The outside coating of the film was Standard Acrylic having a measured $T_g$ of 57° C. The Standard Acrylic contained 12 parts carnauba wax, 30 parts colloidal silica (LUDOX TM40) and 0.5 parts talc. The coating weight was 0.55 g/m². The coating of Example 3 was applied to the inside of the film by a 130 quad gravure cylinder to a coating weight of about 0.8 g/m². The coated film was dried at 121 ° C.

EXAMPLE 5

This example relates to the preparation of a homogenous polymer coating having a monomer ratio of 83.4/14.5/2.1 of ethyl acrylate/acrylonitrile/acrylic acid. The monomer ratio of this film was equivalent to the average monomer ratio of the composition achieved by blending the compositions of Examples 1 and 2.

The polymer was prepared following substantially the same procedure of Examples 1 and 2. The coating was formulated with substantially the same ingredients as in Example 3 and coated onto a polyolefin film substantially as described in Example 4.

EXAMPLE 6

In this example a hard polymer which contained a monomer ratio of 82/17/1 of ethyl acrylate/acrylonitrile/acrylic acid was prepared substantially as described in Examples 1 and 2 and was compounded substantially as described in Example 3.

A film was formed from the coating substantially as described in Example 4.

EXAMPLE 7

In this example a soft polymer which contained a monomer ratio of 88/11/1 ethyl acrylate/acrylonitrile/acrylic acid was prepared as described in Example 1.

The coating was formulated in substantially the same manner as described in Example 3 and coated onto a substrate substantially as described in Example 4.

EVALUATION OF THE EXAMPLES

The properties of each coated film of Examples 4–7 were determined.

The Ambient Quick Tack was determined by placing a film specimen over a spring and bending the film into a "U" shape with the sealing surfaces placed together. The spring ends were closed and the sealing surfaces were placed into the jaws of a crimp sealer to make a seal. The sealing conditions were 80 psi (551 kPa), 0.5 seconds dwell time at a temperature of about 23° C. While the sealing pins were closed, the spring tension was released. The amount of tension (g/in) needed to pull the seal apart was the ambient quick tack value.

The seal strengths were determined by making a seal under the same conditions as the ambient quick tack test (80 psi (551 kPa), 0.5 seconds dwell time at a temperature of about 23° C.). The seal strength was measured by trying to pull the seal apart in a 90° peel test (e.g. using the INSTRON) at between 10 and 30 minutes after the seal was formed.

The low pressure self tack was determined by placing the pressure sealable surface to itself under no applied pressure for 24 hours at ambient temperature. The sample was then placed into a blocking jig which exerted pressure of 0.7 psig (106 kPa) for 4 hours. The force required to separate a sample was measured using the 90° peel test (e.g. using the INSTRON).

The blocking to Standard Acrylic was determined by contacting the pressure sealable coated surface to a Standard Acrylic coated surface at a pressure of 50 psig (446 kPa) at 125° F. (52° C.), 10% relative humidity for 24 hours. The force needed to separate the sample was measured using the 90° peel test (e.g. using the INSTRON).

The results of testing each film sample are reported in the following Table 1:

TABLE 1

| Example | Quick Tack (g/in) | Seal Strength (g/in) | Low Pressure Self Tack (g/in) | Blocking to Standard Acrylic (g/in) |
|---|---|---|---|---|
| 1 | 108 | 482 | 9.6 | 36.7 |
| 5 | <75 | 570 | 32.3 | 23.9 |
| 6 | <71 | 505 | 7.7 | 4.9 |
| 7 | 71 | 290 | 150 | 90 |

The results of these tests showed that the improved method of this invention was very effective in preparing coatings which had low blocking properties and high self-sealability. The coating of example 5, which was equivalent to an average of the monomers of example 4 had inferior self-sealability which demonstrated the advantages of blending the hard polymer with the soft polymer as opposed to making polymer from monomers in proportion to the average composition of the blend.

The coating of example 6 was a hard polymer so, as expected, the blocking was good but the self-sealability was poor.

The coating of example 7 was a soft polymer so, as expected, the self-sealability was good, but the blocking was poor.

What is claimed is:

1. An adhesive coating which is pressure sealable to itself and non-blocking to a dissimilar coating comprising a blend of (a) a soft polymer having a measured glass transition temperature below room temperature; and (b) a hard polymer having a measured glass transition temperature which is higher than the measured glass transition temperature of the soft polymer (a) in a low blocking, pressure sealable coating formable proportion.

2. The adhesive coating according to claim 1 in which the soft polymer (a) comprises (i) at least one nitrile having ethylene unsaturation conjugated with the nitrile group (ii) at least one alkyl acrylate having from 1 to 12 carbon atoms in the alkyl group; 1,3-butadiene; or a vinyl or vinylidene ester; and (iii) at least one ethylenically unsaturated compound containing a carboxylic or a sulphonic acid group.

3. The adhesive coating according to claim 2 in which the monomer (i) further comprises an alkyl methacrylate having from 1 to 12 carbon atoms in the alkyl group or a vinyl aromatic.

4. The adhesive coating according to, claim 3 in which the monomer (i) comprises methyl methacrylate, ethyl methacrylate, propyl methacrylate, isopropyl methacrylate, n-butyl methacrylate, isobutyl methacrylate, t-butyl methacrylate, n-pentyl methacrylate, isopentyl methacrylate, hexyl methacrylate, n-octyl methacrylate, 2-ethylhexyl methacrylate, decyl methacrylate, dodecyl methacrylate; styrene, an alpha-alkyl styrene and vinyltoluene.

5. The adhesive coating according to claim 2 in which the (i) monomer is selected from the group consisting of acrylonitrile and methacrylonitrile; the (ii) monomer is selected from the group consisting of methyl acrylate, ethyl acrylate, propyl acrylate, isopropyl acrylate, butyl acrylate, isobutyl acrylate, t-butyl acrylate, n-pentyl acrylate, isopentyl acrylate, hexyl acrylate, n-octyl acrylate, iso-octyl acrylate, 2-ethylhexyl acrylate, decyl acrylate, 1,3-butadiene, vinyl acetate or vinylidene chloride; and the (iii) monomer is selected from the group consisting of acrylic acid, methacrylic acid, itaconic acid, crotonic acid, maleic acid or sulfoethyl methacrylate.

6. The adhesive coating according to claim 1 in which the hard polymer (b) is (1) a polymer comprising (i) at least one monomer which comprises an alkyl methacrylate having from 1 to 12 carbon atoms in the alkyl group; a vinyl aromatic; or a nitrile having ethylene unsaturation conjugated with the nitrile group; (ii) at least one copolymerizable soft monomer; and (iii) at least one copolymerizable functional monomer or (2) a polymer selected from the group consisting of all-acrylic based polymers; urethanes; ionomers; and polyester-based polymers.

7. The adhesive coating according to claim 6 in which the hard polymer (b) is the (1) polymer comprising (i) at least one monomer selected from the group consisting of an alkyl methacrylate having from about 1 to about 12 carbon atoms in the alkyl group, a vinyl aromatic or acrylonitrile and methacrylonitrile; (ii) at least one monomer selected from the group consisting of methyl acrylate, ethyl acrylate, propyl acrylate, isopropyl acrylate, butyl acrylate, isobutyl acrylate, t-butyl acrylate, n-pentyl acrylate, isopentyl acrylate, hexyl acrylate, n-octyl acrylate, iso-octyl acrylate, 2-ethylhexyl acrylate, decyl acrylate, 1,3-butadiene, vinyl acetate or vinylidene chloride; and (iii) at least one monomer selected from the group consisting of acrylic acid, methacrylic acid, itaconic acid, crotonic acid, maleic acid or sulfoethyl methacrylate.

8. The adhesive coating according to claim 7 in which the (i) monomer comprises methyl methacrylate, ethyl methacrylate, propyl methacrylate, isopropyl methacrylate, n-butyl methacrylate, isobutyl methacrylate, t-butyl methacrylate, n-pentyl methacrylate, isopentyl methacrylate, hexyl methacrylate, n-octyl methacrylate, 2-ethylhexyl methacrylate, decyl methacrylate, dodecyl methacrylate; styrene, an alpha-alkyl styrene and vinyltoluene.

9. The adhesive coating according to claim 1 in which the soft polymer (a) has a measured glass transition temperature ranging from about −25° to about 15° C. and the hard polymer (b) has a measured glass transition temperature ranging from about 15° C. to about 60° C.

10. The adhesive coating according to claim 9 in which the soft polymer (a) has a measured glass transition temperature ranging from about −15° C. to about 5° C. and the hard polymer (b) has a measured glass transition temperature ranging from about 20° C. to about 40° C.

11. The adhesive coating according to claim 1 in which the low blocking, pressure sealable coating formable proportion comprises a ratio ranging from about 120 to about 60 parts by weight hard polymer based upon 100 parts by weight of the soft polymer.

12. The adhesive coating according to claim 11 in which the low blocking, pressure sealable coating formable proportion comprises a ratio ranging from about 35 to about 45 parts by weight of hard polymer based upon 100 parts by weight of the soft polymer.

13. The adhesive coating according to claim 1 in which the soft polymer (a) is substantially in a dispersed phase and the hard polymer (b) is substantially in a solution phase.

14. The adhesive coating according to claim 2 in which the soft polymer (a) comprises from about 5 to about 20 wt. % of (i); about 80 wt. % to about 95 wt. % of (ii) and about 0.1 wt. % to about 10 wt. % of (iii) based on 100 wt. % of the soft polymer.

15. The adhesive coating according to claim 2 in which the soft polymer (a) comprises from about 9 wt. % to about 14 wt. % (i); from-about 85 wt. % to about 90 wt. % (ii); and about 0.5 wt. % to about 5 wt. % (iii) based on 100 wt. % of the soft polymer.

16. The adhesive coating according to claim 6 in which the hard polymer (b) comprises from about 15 wt. % to about 60 wt. % (i); from about 40 wt. % to about 85 wt. % (ii); and about 1 wt. % to about 10 wt. % (iii) based on 100 wt. % of the hard polymer.

17. The adhesive coating according to claim 6 in which the hard polymer (b) comprises from about 20 wt. % to about 40 wt. % (i); from about 60 wt. % to about 80 wt. % (ii); and about 4 wt. % to about 8 wt. % (iii) based on 100 wt. % of the hard polymer.

18. A process for making an adhesive coating which is pressure sealable to itself and non-blocking to a dissimilar coating comprising the steps of:

(a) forming a soft polymer having a measured glass transition temperature below room temperature;

(b) forming a hard polymer having a measured glass transition temperature which is higher than the measured glass transition temperature of the soft polymer (a); and (c) combining the soft polymer (a) and the hard polymer (b) in a low blocking, pressure sealable coating formable proportion.

19. The process according to claim 18 in which the soft polymer (a) comprises (i) at least one nitrile having ethylene unsaturation conjugated with the nitrile group (ii) at least one alkyl acrylate having from 1 to 12 carbon atoms in the alkyl group; 1,3-butadiene; or a vinyl or vinylidene ester; and (iii) at least one ethylenically unsaturated compound containing a carboxylic or a sulphonic acid group.

20. The process according to claim 19 in which the monomer (i) further comprises an alkyl methacrylate having from 1 to 12 carbon atoms in the alkyl group or a vinyl aromatic.

21. The process according to claim 20 in which the monomer (i) comprises methyl methacrylate, ethyl methacrylate, propyl methacrylate, isopropyl methacrylate, n-butyl methacrylate, isobutyl methacrylate, t-butyl methacrylate, n-pentyl methacrylate, isopentyl methacrylate, hexyl methacrylate, n-octyl methacrylate, 2-ethylhexyl methacrylate, decyl methacrylate, dodecyl methacrylate; styrene, an alpha-alkyl styrene and vinyltoluene.

22. The process according to claim 19 in which the (i) monomer is selected from the group consisting of acrylonitrile and methacrylonitrile; the (ii) monomer is selected from the group consisting of methyl acrylate, ethyl acrylate, propyl acrylate, isopropyl acrylate, butyl acrylate, isobutyl acrylate, t-butyl acrylate, n-pentyl acrylate, isopentyl acrylate, hexyl acrylate, n-octyl acrylate, iso-octyl acrylate, 2-ethylhexyl acrylate, decyl acrylate, 1,3-butadiene, vinyl acetate or vinylidene chloride; and the (iii) monomer is selected from the group consisting of acrylic acid, methacrylic acid, itaconic acid, crotonic acid, maleic acid or sulfoethyl methacrylate.

23. The process according to claim 18 in which the hard polymer (b) is (1) a polymer comprising (i) at least one monomer which comprises an alkyl methacrylate having from 1 to 12 carbon atoms in the alkyl group; a vinyl aromatic; or a nitrile having ethylene unsaturation conjugated with the nitrile group; (ii) at least one copolymerizable soft monomer; and (iii) at least one copolymerizable functional monomer or (2) a polymer selected from the group consisting of all-acrylic based polymers; urethanes; ionomers; and polyester-based polymers.

24. The process according to claim 23 in which the hard polymer (b) is the (1) polymer comprising0(i) at least one monomer selected from the group consisting of an alkyl methacrylate having from about 1 to about 12 carbon atoms in the alkyl group, a vinyl aromatic or acrylonitrile and methacrylonitrile; (ii) at least one monomer selected from the group consisting of methyl acrylate, ethyl acrylate, propyl acrylate, isopropyl acrylate, butyl acrylate, isobutyl acrylate, t-butyl acrylate, n-pentyl acrylate, isopentyl acrylate, hexyl acrylate, n-octyl acrylate, iso-octyl acrylate, 2-ethylhexyl acrylate, decyl acrylate, 1,3-butadiene, vinyl acetate or vinylidene chloride; and (iii) at least one monomer selected from the group consisting of acrylic acid, methacrylic acid, itaconic acid, crotonic acid, maleic acid or sulfoethyl methacrylate.

25. The process according to claim 24 in which the (i) monomer comprises methyl methacrylate, ethyl methacrylate, propyl methacrylate, isopropyl methacrylate, n-butyl methacrylate, isobutyl methacrylate, t-butyl methacrylate, n-pentyl methacrylate, isopentyl methacrylate, hexyl methacrylate, n-octyl methacrylate, 2-ethylhexyl methacrylate, decyl methacrylate, dodecyl methacrylate; styrene, an alpha-alkyl styrene and vinyltoluene.

26. The process according to claim 18 in which the soft polymer (a) has a measured glass transition temperature ranging from about −25° to about 15° C. and the hard polymer (b) has a measured glass transition temperature ranging from about 15° C. to about 60° C.

27. The process according to claim 26 in which the soft polymer (a) has a measured glass transition temperature ranging from about −15° C. to about 5° C. and the hard polymer (b) has a measured glass transition temperature ranging from about 20° C. to about 40° C.

28. The process according to claim 18 in which the step (c) comprises combining the soft polymer (a) and the hard polymer (b) in a ratio ranging from about 20 to about 60 parts by weight hard polymer based upon 100 parts by weight of soft polymer.

29. The process according to claim 28 in which the step (c) comprises combining the soft polymer (a) and the hard polymer (b) in a ratio ranging from about 35 to about 45 parts by weight hard polymer based upon 100 parts by weight of soft polymer.

30. The process according to claim 18 in which the soft polymer (a) is substantially in a dispersed phase and the hard polymer (b) is substantially in a solution phase.

31. The process according to claim 19 in which the soft polymer (a) comprises from about 5 to about 20 wt. % of (i); about 80 wt. % to about 95 wt. % of (ii) and about 0.1 wt. % to about 10 wt. % of (iii) based on 100 wt. % of the soft polymer.

32. The process according to claim 19 in which the soft polymer (a) comprises from about 9 wt. % to about 14 wt. % (i); from about 85 wt. % to about 90 wt. % (ii); and about 0.5 wt. % to about 5 wt. % (iii) based on 100 wt. % of the soft polymer.

33. The process according to claim 23 in which the hard polymer (b) comprises from about 15 wt. % to about 60 wt. % (i); from about 40 wt. % to about 85 wt. % (ii); and about 1 wt. % to about 10 wt. % (iii) based on 100 wt. % of the hard polymer.

34. The process according to claim 23 in which the hard polymer (b) comprises from about 20 wt. % to about 40 wt. % (i); from about 60 wt. % to about 80 wt. % (ii); and about 4 wt. % to about 8 wt. % (iii) based on 100 wt. % of the hard polymer.

35. A cold sealable coating made by the process of claim 18.

36. A coated substrate comprising a polyolefin film having a first side and a second side, the first side having applied thereto the adhesive coating as described in claim 1.

37. A coated substrate comprising a polyolefin film having a first side and a second side, the first side having applied thereto the adhesive coating as described in claim 1 and the second side having applied thereto an acrylic-based printable coating.

* * * * *